US011468675B1

(12) United States Patent
Agarwal

(10) Patent No.: US 11,468,675 B1
(45) Date of Patent: Oct. 11, 2022

(54) TECHNIQUES FOR IDENTIFYING OBJECTS FROM VIDEO CONTENT

(71) Applicant: Amazon Technologies, Inc., Seattle, WA (US)

(72) Inventor: Vaibhav Agarwal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 390 days.

(21) Appl. No.: 16/701,830

(22) Filed: Dec. 3, 2019

(51) Int. Cl.
*G06V 20/40* (2022.01)
*G06Q 30/06* (2012.01)
*G06N 20/00* (2019.01)

(52) U.S. Cl.
CPC ............ *G06V 20/41* (2022.01); *G06N 20/00* (2019.01); *G06Q 30/0603* (2013.01); *G06Q 30/0643* (2013.01)

(58) Field of Classification Search
CPC .... G06V 20/41; G06N 20/00; G06Q 30/0603; G06Q 30/0643
USPC ........................................................ 382/103
See application file for complete search history.

(56) References Cited

U.S. PATENT DOCUMENTS

| 10,854,014 | B2 * | 12/2020 | Rao | .................... | H04N 21/8583 |
| 11,023,707 | B2 * | 6/2021 | Seshadri | ................ | G06V 20/52 |
| 2008/0204569 | A1 * | 8/2008 | Miller | .................... | G06V 20/40 |
| | | | | | 348/222.1 |

* cited by examiner

*Primary Examiner* — Congvan Tran
(74) *Attorney, Agent, or Firm* — Kilpatrick Townsend & Stockton LLP

(57) ABSTRACT

Systems, methods, and computer storage media are described herein for identifying objects within video content. Utilizing an image recognition technique (e.g., a previously trained neural network) an object may be detected within a subset of the video frames of a scene of the video content. Metadata may be generated comprising a set of object attributes (e.g., an object image, a URL from which the item may be procured, etc.) associated with the object detected within the subset of video frames. A request for object identification may subsequently be received while a user is watching the video content. A run time of the request may be utilized to retrieve and display one or more object attributes (e.g., an object image with an embedded hyperlink) corresponding to an object appearing in the scene.

20 Claims, 10 Drawing Sheets

TECHNIQUES FOR IDENTIFYING OBJECTS FROM VIDEO CONTENT

BACKGROUND

Often, the popularity of an item (e.g., apparel, furniture, briefcases, home goods, etc.) may soar as a result of being featured in a television show or movie. By way of example, a popular actor may wear particular clothing during the course of a movie. Currently, a viewer would have to perform a variety of searches to identify the item and/or similar items within one or more online retail websites. This can be a lengthy process where the viewer essentially guesses what search terms might be successful in finding the item. The viewer can easily become frustrated with the experience and may never actually find the item they desire. Additionally, the websites these viewers peruse may experience needlessly increased traffic from these searches which may cause latency in the system, negatively impacting the experience of all system users. Embodiments disclosed herein address these problems, individually, and collectively.

BRIEF DESCRIPTION OF THE DRAWINGS

Various embodiments in accordance with the present disclosure will be described with reference to the drawings, in which.

DETAILED DESCRIPTION

Figure 1:
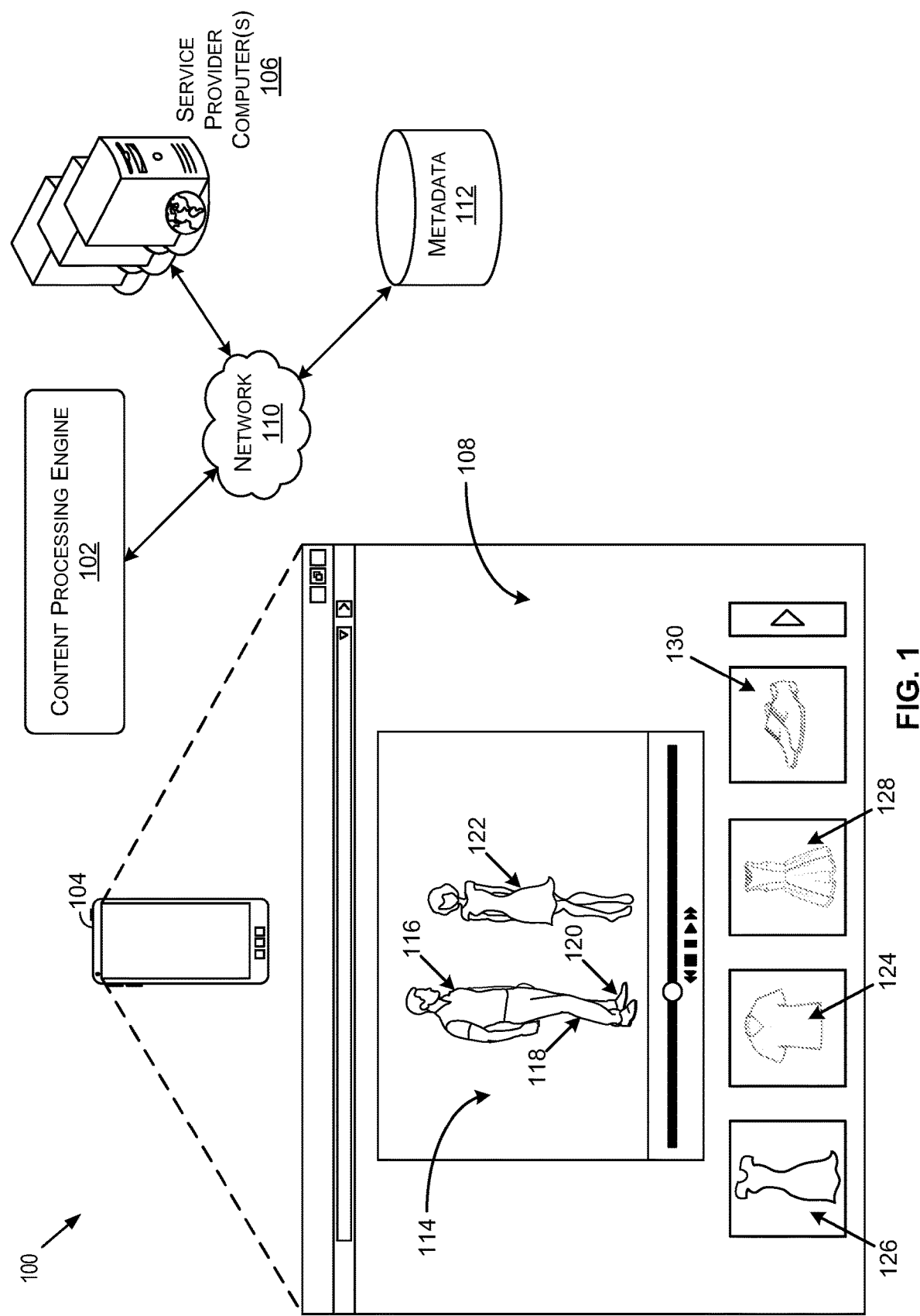
FIG. 1 illustrates an example environment for identifying objects within video content utilizing a content processing engine, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to identifying objects from video content. These objects may be items that are offered for consumption at a website of an online retailer and/or listed in an electronic catalog of items. Generally, an object may include any physical item (e.g., apparel, vehicles, furniture, a particular person/place/thing, logos, etc.). In some embodiments, an instance of video content (e.g., a video of any suitable length and/or resolution) may be processed to identify scenes within the content. A "scene" may include an uninterrupted series of video frames captured from a particular perspective. In some embodiments, scenes may be identified by comparing temporally adjacent video frames (e.g., adjacent video frames in a sequence of video frames) to determine if the frames depict content that is different by some amount exceeding a predefined threshold. If the frames are different by at least the threshold amount, the first frame may be identified as the last frame of the previous scene and the second frame may be identified as the first frame of a new scene.

After the scenes are identified, a number of the video frames of each scene may be utilized with image recognition techniques to identify one or more object features. In some embodiments, a quality score may be calculated for each of the video frames based at least in part on the object features depicted therein. Some number of video frames having the best quality scores may be selected and the object features of those frames may be compared to object feature sets corresponding to object images of a catalog (e.g., a catalog of an online retailer). When an object image of the catalog matches (e.g., above some confidence threshold) the object depicted in the video frame, metadata of the object in the catalog (e.g., an object identifier, an object image, any suitable object attribute) may be associated with the scene. It should be appreciated that the metadata for the object in the catalog may be periodically updated within the catalog. Thus, in some embodiments, the video frame may be associated with an object identifier with which current objects attributes may be retrieved from the catalog at any suitable time. In some embodiments, object attributes of the catalog can be updated to indicate the object was detected in the video content. Later (e.g., while a user is viewing the video content, at the end credits, based on a search request, etc.), any suitable number of graphical elements (e.g., images, hyperlinks, etc.) associated with the object may be presented at the user's device (another computing device) at the time when the object is presented within scene (or for a threshold period of time). Utilizing such techniques, the user may be informed of (e.g., provided information with respect to) the objects depicted within the scene while the objects are being depicted. Additionally, in some embodiments, the user may utilize provided graphical elements to access an online retailer's website where the user may procure the object (e.g., where the user can purchase the object and/or an associated item and/or service from the online retailer).

In some embodiments, a collection of video content may be processed to identify scenes and objects in a similar manner as described above. In some embodiments, the collection of video content may be selected from a larger corpus based at least in part on how recent the video content was released/created. For example, the collection of video content may include all movies released in the last week. Once objects are identified within each movie, the objects found in each movie may be compared. A relevancy score for each object may be calculated based at least in part on how many times the object appears in different video content of the collection. The more often the object appears, the more likely the object is going to be or is a popular item, and the higher the relevancy score may be. In some embodiments, the relevancy score may be weighted based at least in part on production data associated with the video content. For example, ending credits of the video content may be processed with image recognition techniques to identify fashion contributors and/or costume designers or the like which were involved with the video content. The fashion contributors and/or costume designers identified may be compared to a list of known fashion contributors/costume designers each associated with a popularity score. In some cases, the higher the popularity score of the fashion contributors/costume designers, the higher the relevancy scores will be for the object appearing in the movie. Still further, if the video content itself is provided by a fashion organization, a fashion designer, or the like which is known to be popular (e.g., as determined from a predefined list), every object detected in the video content may receive relatively high relevancy scores (e.g., relevancy scores exceeding a predefined relevancy threshold). In any case, if an object's relevancy score exceeds a predefined relevancy threshold, the object may be considered a popular item and a set of popular items may be presented. As a non-limiting example, an online retailer may present the set of popular items to customers on a website hosted by the online retailer.

In some embodiments, any suitable number of instances of video content may be processed and object identified. In some embodiments, the metadata generated for the scene that includes data associated with the object may further include a location component indicating approximately wherein in the frame the object was depicted. Later, a user may pause the video and utilize an interface to create a bounding box around an object depicted in the scene. The scene may be identified based at least in part on the current run time and an object may be identified from the metadata based at least in part on the scene and the location of the bounding box. Utilizing such techniques, a user may utilize the interface to identify objects within video content during run time.

In some embodiments, the catalog of objects (e.g., an online retailer's catalog) can be enriched with indicators identifying content in which each object appeared. Thus, in some embodiments, a user could search for all content that depict a particular actor (e.g., Actor Bob) wearing a particular brand of apparel (e.g., brand X). In these instances, the system could utilize search terms such as "Actor Bob," and "brand X" to search the metadata for the video content (and/or any video content previously processed by the system) to identify all content in which Actor B is depicted wearing brand X clothing.

In some embodiments, the metadata associated with a scene may be utilized to generate one or more advertisements. For example, if a particular object was identified within a scene, the system may be configured to select a pregenerated advertisement corresponding to the object to be presented. As another example, the system could identify the object to another system that is configured to select advertisements for presentation and the other system could then select an advertisement corresponding to object for presentation.

Techniques discussed herein provide technical improvements by reducing network traffic at an online retailer's website. By identifying object within video content as disclosed herein, the system may reduce or eliminate efforts by the user to identify the object and/or where to procure the object. Accordingly, the user's experience is improved and the online retailer's website may experience less traffic as users would not be utilizing the online retailer's to manually search for such items.

FIG. 1 illustrates an exemplary environment 100 for identifying objects (e.g., items) within video content utilizing a content processing engine 102, in accordance with at least one embodiment. An object can include any suitable physical object such as a shirt, a pair of boots, a vase, a piece of furniture, a blazer, a dress, and the like. The environment 100 may include a user device 104 and service provider computer(s) 106. User device 104 may execute an application (e.g., a content player application, a web browser application, etc.) which can provide the interface 108 for interacting with video content. The application may be configured to communicate with the service provider computer(s) 106 via network(s) 110. In some embodiments, network(s) 110 may be any suitable communications network such as a wide area network (e.g., the Internet), a local area network, and/or a cellular network, to name a few. The service provider computer(s) 106 may be configured execute the content processing engine 102 which may utilized to generate metadata 112.

In some embodiments, metadata 112 may identify the object(s) depicted in each scene within a given instance of video content. By way of example, the content processing engine may process video content to identify frames within the content in which one or more objects are depicted. Video frame 114 may depict, for example, a number of objects such as a shirt 116, pants 118, shoes 120, and dress 122. This is merely an example, any suitable number of objects may be identified within any given frame. Image recognition techniques (e.g., Markov models, Bayesian models, neural networks, and the like that are trained to identify object features within an image/video frame) may be utilized to identify object features of the object depicted in the image (e.g., the video frame 114). In some embodiments, the object features may include any suitable attribute of the object such as color, pattern, shape, size, edges, gradients and any suitable portion of the object. For example, utilizing a previously trained neural network, the video frame can be identified as including a shirt that is solid color (e.g., a particular shade of blue) including one (short) sleeve, a portion of a shirt front, and a collar (e.g., a v-neck collar). The neural network may also identify the shirt as being a pullover (e.g., lacking buttons) as well as having a style that is relatively fitted to the wearer.

Once identified, the object features of the shirt 116, the pants 118, the shoes 120, and the dress 122 may be compared to previously identified (or specified) features of each object image in a catalog of object images. The catalog of object images may include every (or some subset) of object images provided by an online retailer. By way of example, the features of shirt 116 outlined above may be compared to the known feature set of object image 124. If the features of shirt 116 match the known feature set of object image 124 over some threshold amount (e.g., with over 50% confidence score), the object image 124 may be associated with the scene and/or the run time at which the shirt 116 is depicted. Each of the object images 126-130 may be associated with the scene and/or run time at which their corresponding objects are depicted within the video content. In some embodiments, object images 126-130 and any suitable corresponding object data (e.g., an item title, an item description, an item color, an item material, an item identifier such as a barcode or product ID, a uniform resource locator (URL) corresponding to a product page from which the object may be procured/purchased, etc.) may be stored in metadata 112 as being associated with the scene (or run time) in which the objects are depicted.

Later, when a user watches the video content (e.g., via the user device 104), object images 126-130 may be presented at the beginning of the scene and for the duration of the scene in which they appear. In some embodiments, the scene may have a relatively short duration (e.g., less than ten seconds). Thus, in some embodiments, to improve the user's experience and to give the user time to view the images, the object images 126-130 may be presented for some predefined period of time after the beginning of the scene (or after the runtime associated with each object). As another example, a search for video content may present the video content and the object images 126-130 to indicate the objects features within the video. The object images 126-130 may be presented in any suitable environment as being associated with the video. It should be appreciated that object images 126-130 are used for illustration only and that any suitable portion of the object attributes stored in the metadata 112 may be utilized for presentation at the interface 108. In some embodiments, selection of any one of the object images may navigate the user device to a URL associated with the object and hosted by an online retailer from which the object may be procured (e.g., purchased).

Figure 2:
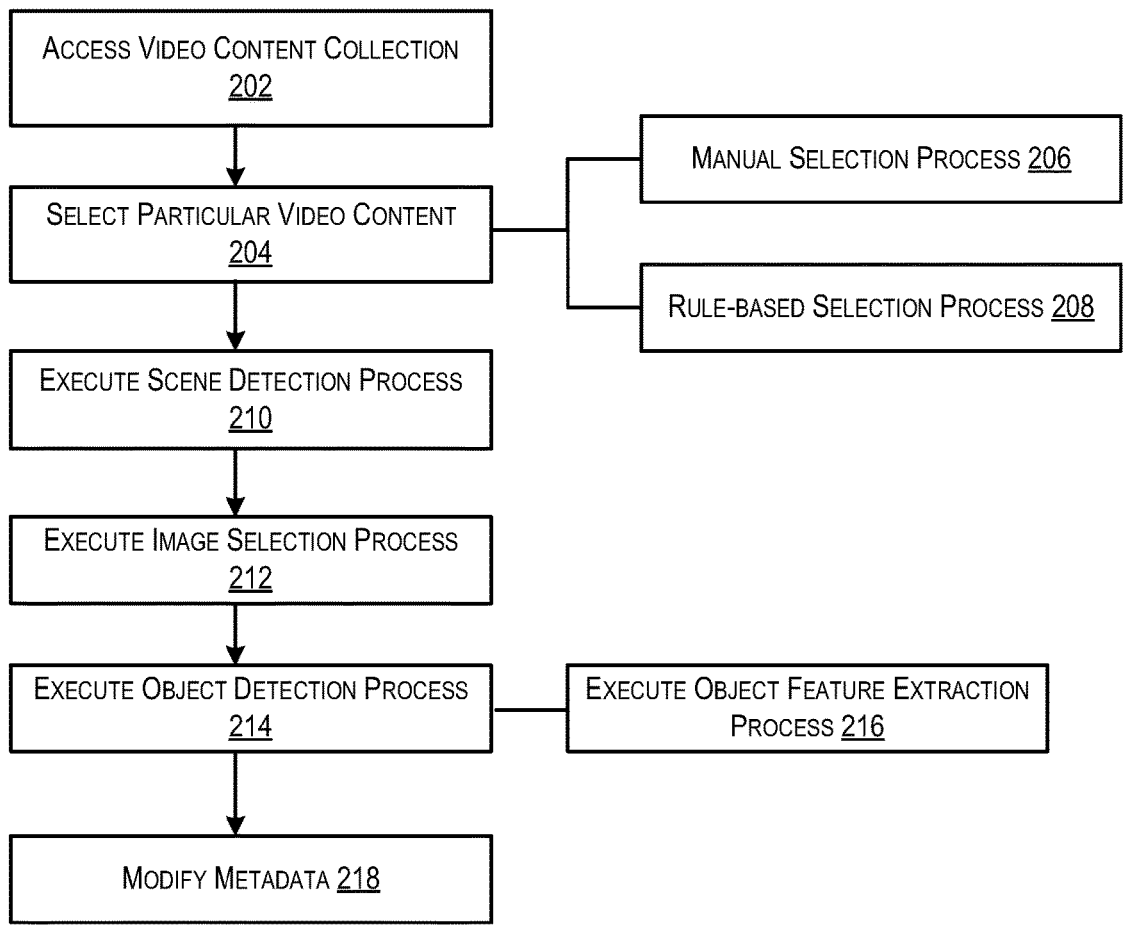
FIG. 2 illustrates an example process for generating content metadata corresponding to object detected within video content, in accordance with at least one embodiment.

FIG. 2 illustrates an exemplary process 200 for generating content metadata corresponding to object detected within video content, in accordance with at least one embodiment. Process 200 may be performed by the content processing engine 102 of FIG. 1. The steps of process 200 may be performed in any suitable order.

Process 200 may begin at block 202 wherein a collection of video content may be accessed. The collection of video content may include one or more instances of video content managed by a video content provider. In some embodiments, the content processing engine 102 may be executed by, or on behalf of the video content provider. In other embodiments, the content processing engine 102 may be provided by an entity other than the video content provider. The collection of video content may include any suitable video content such as television episodes, movies, documentaries, or any suitable video of any suitable length.

At 204, particular video content may be selected. Selecting content may be performed in one of two ways, either through manual selection or through rule-based selection. For example, the content processing engine 102 may execute a manual selection process at 206 in which a user of the content processing engine 102 identifies (e.g., via an interface provided by the content processing engine 102) a particular instance of video content to be processed. In other embodiments, the content processing engine 102 may execute rule-based selection process at 208. By way of example, in some examples in which the content processing engine 102 is to identify a number of popular items, the content processing engine 102 may execute a predefined rule set as part of the rule-based selection process 208 to select a number of video content instances from the video content collection. By way of example, a predefined rule can indicate that all video content released within the last week, month, or year may be selected. If so, the content processing engine 102 may access metadata associated with each video to identify videos having release dates in the specified time period. Another rule may indicate that video content featuring particular actors/actresses (e.g., identified from a predefined list of actors/actresses) is to be selected from the collection for processing. As yet another example, a rule may indicate that video content produced by a particular organization and/or involving the particular organization (e.g., a fashion designer) is to be selected. Another rule may indicate that all video content in the collection is to be selected according to a predefined schedule and/or periodicity such that every instance of video content will be processed by the content processing engine 102 over some period of time. The particular rules included in the predefined rule set may vary depending on the context in which the content processing engine 102 is to be utilized.

Once one or more instances of video content are selected (e.g., via the manual selection process 206 or the rule-based selection process 208), the content processing engine 102 may execute scene detection process 210. In some embodiments, scene detection process 210 may include analyzing each selected video content instance to identify scenes within the video content. A "scene" may include an uninterrupted series of video frames captured from a particular perspective. In some embodiments, scenes may be identified by comparing temporally adjacent video frames to determine if the frames depict content that is different by some amount exceeding a predefined threshold. If the frames are different by at least the threshold amount, the first frame may be identified as the last frame of the previous scene and the second frame may be identified as the first frame of a new scene. As a non-limiting example, two sequential (e.g., temporally adjacent) video frames may be compared pixel by pixel or object features, lighting, facial features, or the like may be identified using any suitable image recognition techniques.

For example, in some embodiments, in order to identify a scene, pixels from each of two sequential video frames may be compared. If the pixel colors, as a whole, differ between the images over some threshold amount (e.g., a predefined threshold) then the first image may be considered the end of a scene and the second image may be considered the beginning of the next scene.

As an example, utilizing an image recognition technique to identify objects within a video frame may include obtaining a mathematical model (e.g., a neural network, a convolutional neural network, a recurrent neural network, a classification model, etc.) that has been previously trained to identify objects, lighting, facial features, or the like from training examples. In some embodiments, the mathematical model may have been previously trained with training examples (e.g., images) depicting known objects, object attributes, facial features, and lighting. These images may be labeled as including said objects, object attributes, facial features, and lighting. The images and the corresponding labels may be utilized with any suitable supervised learning algorithm to train the mathematical model to identify similar objects, object attributes, facial features, and lighting in subsequently provided input images. Some example supervised learning algorithms may include, nearest neighbor, Naive Bayes, decision trees, linear regression, and neural networks.

Thus, in some embodiments, in order to identify a scene, each of two sequential video frames may be provided to the model as input to obtain corresponding object feature sets (e.g., a set of object features detected within the image). These object feature sets may be compared and if the object feature sets differ over some threshold amount (e.g., a predefined threshold) then the first image may be considered the end of a scene and the second image may be considered the beginning of the next scene.

Figure 3:
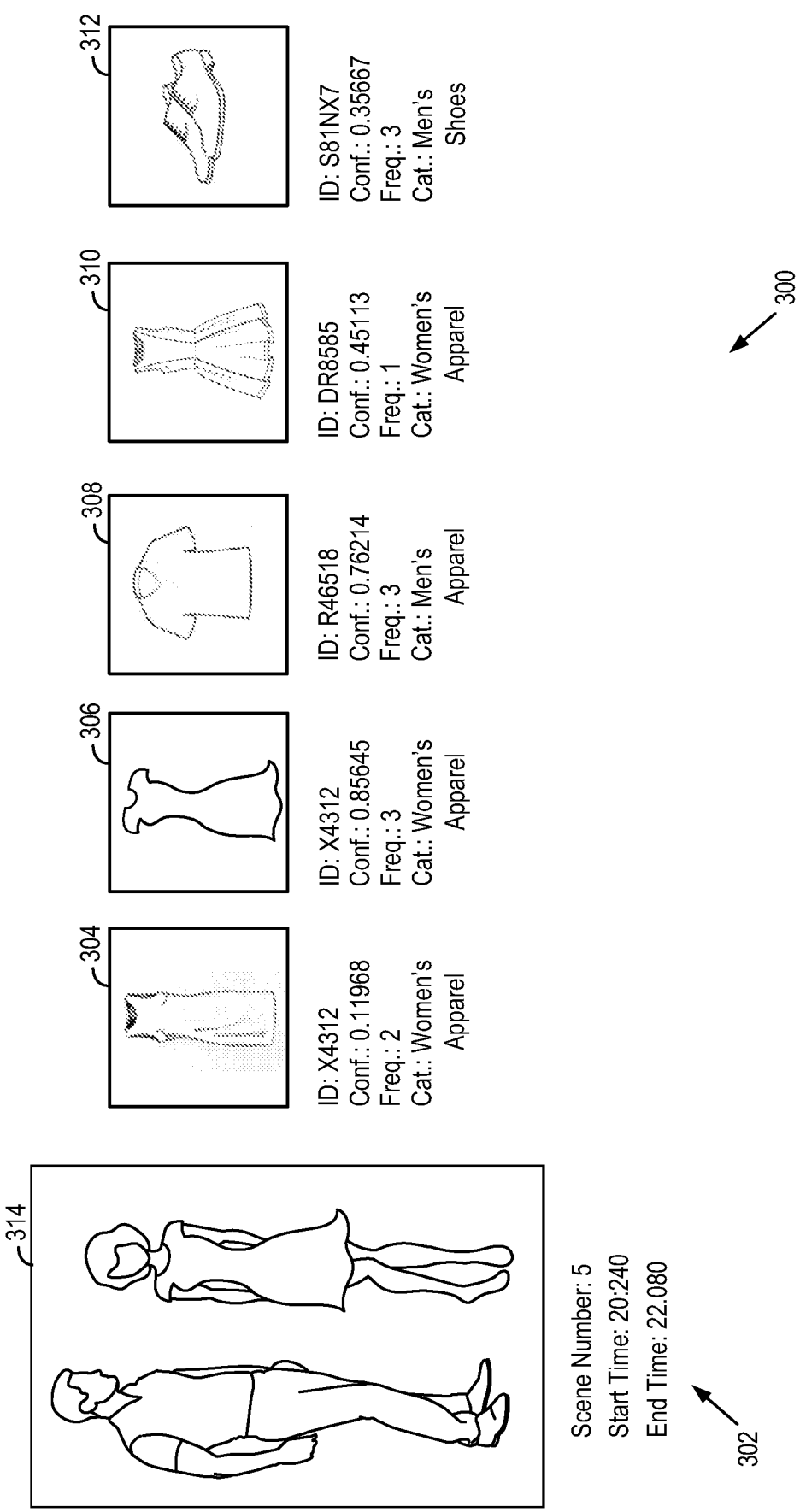
FIG. 3 illustrates an example process for utilizing the content processing engine to select a number of images within a scene, in accordance with at least one embodiment.

If a scene is identified, metadata may be generated for the scene. FIG. 3 illustrates an example of content metadata 300, in accordance with at least one embodiment. The content metadata 300 may include a start time (e.g., a runtime corresponding to the first video frame in the scene) and an end time (e.g., a runtime corresponding to the last video frame in the scene), and an identifier assigned to the scene (e.g., an alphanumeric value of any suitable length) as depicted at 302 of FIG. 3.

Returning to FIG. 2, one the scenes are identified within a given instance of video content, an image selection process 212 may be executed. The image selection process 212 may include, for each scene, obtaining the video frames of the scene (e.g., the video frames occurring between the start time and end time associated with the scene). Utilizing an image recognition technique, object features may be identified in each frame. As described above, the object features may include any suitable attribute of the object such as color(s), pattern(s), and any suitable portion of the object. By way of example, one video frame may depict a man wearing a sweater from a profile view. Accordingly, utilizing previously trained image recognition model, the video frame may be identified as including a sweater, and that one sleeve of a sweater may be identified as being presented in the video frame. In a subsequent video frame, the man may have turned toward the camera. The model may identify this video frame as including a sweater for which two sleeves of the sweater, a collar, and buttons of the sweater appear. In some embodiments, each of the video frames may receive a quality score based at least in part on the object and/or object features identified. The quality score may represent how well a particular object is depicted in a particular video frame, for example, video frames that are high quality with respect to a particular object may yield object features that can be reliably mapped to a corresponding entry for the object in a catalog, while video frames that are low quality with respect to the particular object may yield object features that result in ambiguous mapping to catalog entries. There may be multiple quality scores associated with video frames, for example, a quality score corresponding to each object of interest in the video frame. The quality score for one object in a video frame may be high, while the quality score for another object in the video frame is low.

By way of example, the image selection process may be defined such that an quality score may be calculated based on a number of predefined rules. By way of example, for objects that are identified as being a sweater, a predefine rule may specify that a best depiction of a sweater may include at least a first sleeve, a second sleeve, and a collar. The individual video frames may be scored based at least in part on how many object features depicted in the given frame are identified as being the same as an object feature of the best depiction of the object. For example, the first video frame including only one sleeve may receive a lower quality score than the second video frame that includes two sleeves, a collar, and buttons. The second video frame may receive a higher quality score because the two sleeves and the collar match the features specified in rule defining the best depiction of a sweater. In some embodiments, objects that include additional features than those of the best depiction of the object may receive higher quality scores based at least in part on how many additional features are depicted above and beyond the features specified in a best depiction of a sweater. In some embodiments, some number of video frames of the scene may be selected based at least in part on the quality scores associated with each frame. As a non-limiting example, the three video frames having the highest quality scores may be selected. By selecting video frames based at least in part on the quality scores, the object detection process described below is more likely to be accurate in detecting objects within the video frames and the image selection process has ensured that video frames that generally depict more object features are selected over those video frames that depict less object features. Additionally, by selecting only a subset of the video frames, the object detection process is improved by avoiding detecting object for every single frame of the scene.

Figure 4:
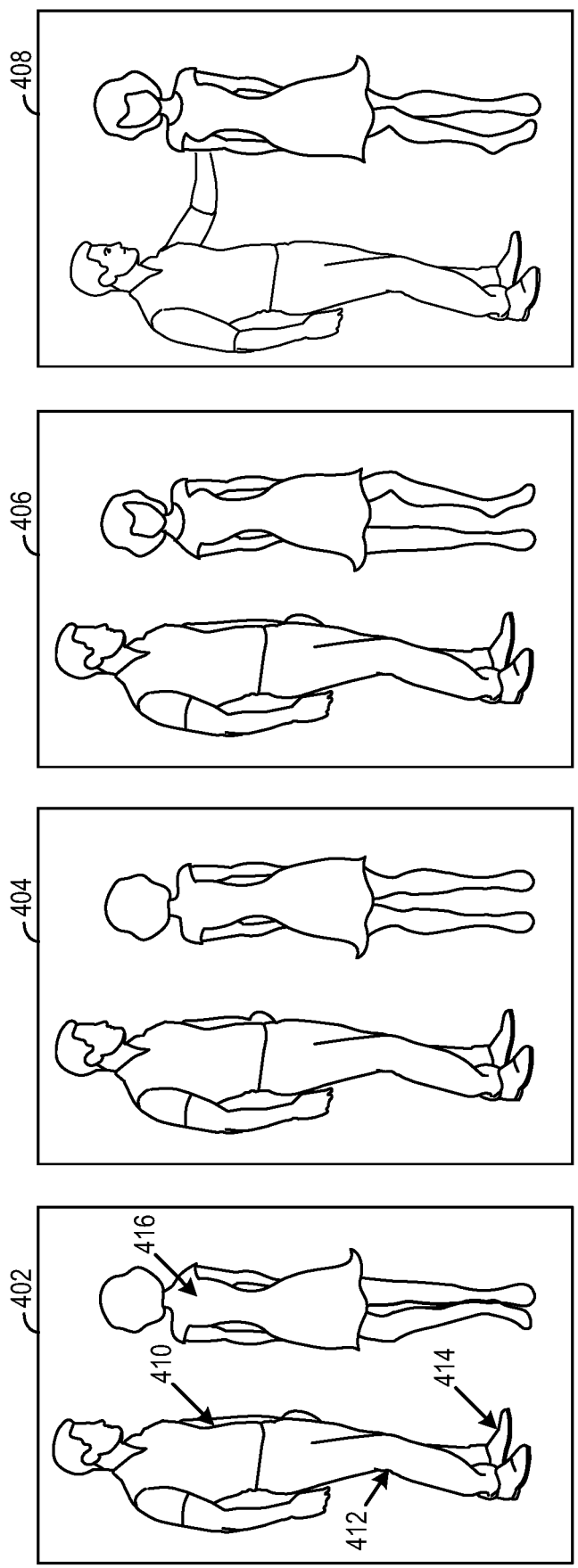
FIG. 4 illustrates an example of content metadata, in accordance with at least one embodiment.

FIG. 4 illustrates an exemplary process 400 (e.g., the image selection process 212) for utilizing the content processing engine to select a number of video frames within a scene, in accordance with at least one embodiment. Video frames 402, 404, 406, and 408 may be individual video frames within a common scene. In some embodiments, the video frames 402, 404, 406, and 408 may be obtained by sampling video frames of the scene according to a predetermine periodicity (e.g., 1 frame every half second, one frame a second, etc.). Each of the video frames 402-408 may receive a quality score quantifying a quality assessment for the image. The higher the score, the better the quality. As described above, the quality score may be calculated based at least in part on a number of object features identified in the video frame and a predefine set of features associated with a best depiction of the object (or an object of that type).

By way of example, video frames 402 and 404 may each be identified (e.g., utilizing a image recognition model) to include a shirt 410, pants 412, a pair of shoes 414, and a dress 416. The visible attributes of the shirt 410 within video frames 402 and 404 may be identified as one short sleeve and a collar. The visible attributes of the pants 412 may be identified as a single pant leg. The visible attributes of the shoes 414 may be identified two shoes. The visible attributes of the dress 416 may include two sleeve and a back portion of the dress 416. Thus, although the posture of the actor/actress may differ, the video frames 402 and 404 may receive a similar quality score based at least in part on depicting the same object features of the shirt 410, the pants 412, the shoes 414, and the dress 416.

The quality scores for each of the video frames 402 and 404 may be determined based at least in part on comparing the object features detected in the video frames 402 and 404 with a set of object features defining a best depiction of each of the objects depicted in the given video frame. By way of example, a predefined set of object features may define a best depiction of a shirt. Other object feature set may define a best depiction of a pair of shoes. Yet another object feature set may define a best depiction of a pair of pants. And still another object feature set may define a best depiction of a dress. In some embodiments, a best depiction of a shirt may be defined by an object feature set that includes two sleeves (short or long) and a collar. A best depiction of a dress with sleeves may be defined by an object feature set include two sleeves, a front portion of the dress, and a collar/neckline of the dress.

In some embodiments, the video frame 406 may be identified (e.g., utilizing the image recognition model) as including the same objects (e.g., the shirt 410, pants 412, the pair of shoes 414, and the dress 416). The visible attributes of the shirt 410 within video frame 406 may be identified as one short sleeve and a collar. The visible attributes of the pants 412 may be identified as a single pant leg. The visible attributes of the shoes 414 may be identified two shoes. The visible attributes of the dress 416 may include two sleeve and a front portion of the dress 416.

The video frame 408 may be identified (e.g., utilizing the image recognition model) as including the same objects (e.g., the shirt 410, pants 412, the pair of shoes 414, and the dress 416). The visible attributes of the shirt 410 within video frame 408 may be identified as two short sleeves and a collar. The visible attributes of the pants 412 may be identified as a single pant leg. The visible attributes of the shoes 414 may be identified two shoes. The visible attributes of the dress 416 may include two sleeves and a front portion of the dress 416.

By comparing the object features of the video frame 408 and the video frame 406 to the predefined object feature sets defining the features required for a best depiction of the corresponding objects, the video frame 408 may be assigned a quality that is higher than the quality score of the video frame 406 (indicating higher quality) based at least in part on video frame 408 including more features of the best depiction feature sets for a shirt and dress. Similarly, video frame 406 may be assigned a higher quality score than the quality scores of video frame 402 and 404 based at least in part on video frame 408 including more features of the best depiction feature sets for a shirt and dress. While the features detected for shoes 414 and pants 412 may be utilized to calculate each of the quality scores, these features likely would not cause the quality scores to differ since the same features of these objects are depicted in each of the video frames 402-408.

Returning now to FIG. 2. Once the best quality video frames of the scene have been selected (e.g., the video frames 406 and 408 of FIG. 4), the object detection process 214 may be executed. The object detection process 214 may include executing an object feature extraction process 216. The object feature extraction process 216 may be similar or the same as the process for identifying object features from images discussed above in connection with FIG. 4. In some embodiments, the object features extracted from a given video frame during calculation of the quality score may be stored and later used for the object detection process 214, or each of the selected video frames may be once again provided to the model as input in order to identify a set of object features depicted in each video frame. The object feature set of each video frame may be compared to object feature sets corresponding to individual object images of a catalog (collection) of object images. The collection of object images may represent images that appear in an online electronic catalog from which corresponding objects may be obtained (e.g., purchased). As a non-limiting example, an image of the exact same dress (e.g., dress 416 of FIG. 4) depicted in a video frame may be included in a predefined collection of object images (e.g., an image of the dress utilized by an online retailer). If the feature set extracted from a video frame matches the feature set of an object image from the catalog by over a predefined threshold amount (e.g., 80% similar or above, etc.) then the metadata 300 of FIG. 3 may be modified to include any suitable object data.

By way of example, each object image of the catalog may be associated with object data such as, but not limited to, an object identifier (e.g., a unique alphanumeric identifier by which the online retailer identifies the object in the catalog), an object image, a category (e.g., women's apparel, shoes, outerwear, etc.), or any suitable object attribute (e.g., an attribute of an object such as color, material, or the like). In some embodiments, the object may be referenced by an object identifier within the metadata 300 such that the object identifier can be used to retrieve other object attributes from the catalog (e.g., a remote system that hosts the catalog). The metadata 300 may be modified at 218 as depicted in FIG. 3.

For example, metadata 300 may be modified to include the object images 304-312 corresponding to object images that include feature sets that are similar to feature sets of objects found in the selected video frames (e.g., the video frames selected by executing image selection process 212 of FIG. 2). In some embodiments, a confidence score may be calculated quantifying a degree of confidence that the object is depicted in the scene. In some embodiments, the confidence score may be calculated based at least in part on the number of object features shared between the object depicted in the video frame 314 (e.g., the video from 406 of FIG. 4) and the features associated with the object from the catalog. In some embodiments, the confidence score may be higher for objects that are detected in multiple frames. By way of example, metadata may include a frequency data field for each object indicating how many of the selected video frames of the scene were determined to include the object. By way of example, object 304 may have been detected in two video frames (e.g., the video frame 314 and one other) while the object 306 may have been detected in three of the selected video frames (e.g., the video frame 314 and two others).

In some embodiments, the confidence score can be increased based at least in part on a number of other video frames in the scene being associated with the same object (e.g., the same object was detected in those frames). In some embodiments, a confidence score can be increased more for an object when it appears in a number of frames of the scene (e.g., 2 other frames) than when it appears in a lesser number of frames (e.g., 1 other frame, no other frames, etc. In some embodiments, the confidence score for an object can be increased when the same object is detected in temporally related scenes. To be temporally related, the scenes must occur within a threshold period of time of one another. When an object is detected in one scene and shortly thereafter in another scene, it is more likely that the object is being accurately detected. Accordingly, the confidence score can be increased by some amount based at least in part on a number of other scenes in which the object is detected. In some embodiments, selection of the object(s) (e.g., via the graphical elements 126-130 of FIG. 1) may also be utilized to increase the confidence score. For example, if a particular object was detected within a scene and later a viewer selected a graphical element corresponding to that object (e.g., to purchase said object), the system may increase the confidence score for the object (e.g., by some predetermined amount, according to a predetermined rule set, etc.).

Although not depicted, in some embodiments, location data associated with each object may be stored within metadata 300 or as a separate record. For example, a run time (and/or a duration) corresponding to one or more video frames and a set of coordinates (or location/dimensions of a bounding box) identifying where the object is depicted within the video frame may be stored for subsequent use. This information may be utilized later to identify an object based on run time and location data (e.g., such as coordinates of a selection, dimensions and location of a bounding box, etc.).

Figure 5:
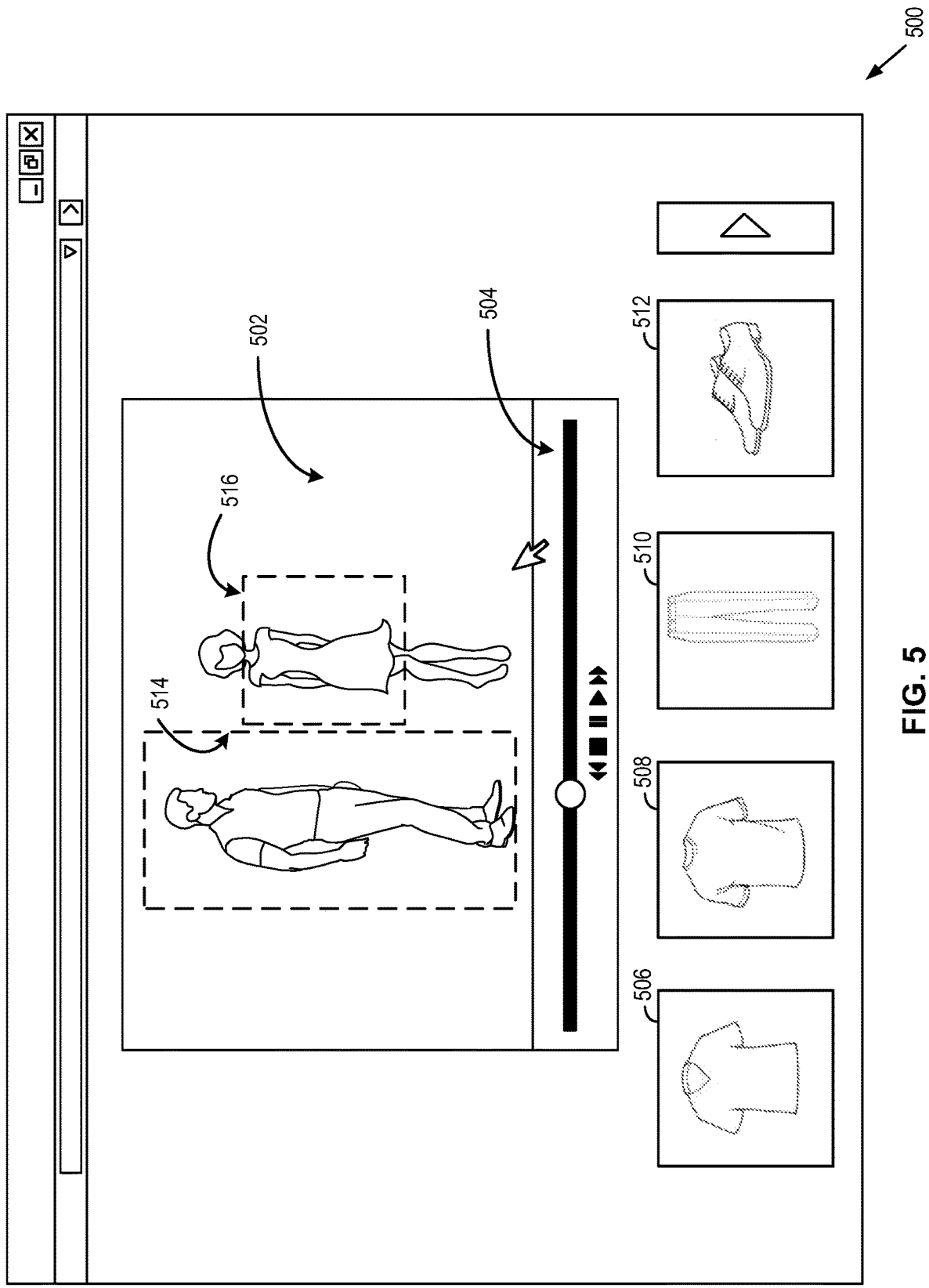
FIG. 5 is a schematic diagram of an example interface for interacting with the content processing engine, in accordance with at least one embodiment.

FIG. 5 is a schematic diagram of an interface 500 for interacting with the content processing engine (e.g., the content processing engine 102), in accordance with at least one embodiment. Once the video content has been processed according to the process 200 of FIG. 2 and metadata has been generated for each scene as described above in connection with FIGS. 2 and 3, a user may play the video content (e.g., at the user device 104 of FIG. 1). The interface 500 may be an example interface from which the user may play the video content. The interface 500 may be provided by an application executing at the user device and may be hosted by the content processing engine.

The interface 500 may include an example of a viewing window 502 within which the video content is presented and an example control area 504 from which the video content may be rewound, fast forwarded, played, stopped or paused. As the video content is played (and/or at any suitable such as after the ending credits, during the opening credits, etc.), the application may submit any suitable number of object identification requests to the content processing engine. By way of example, the application may submit an object identification request each second while the video content is played. Each object identification request may include the current run time of the video. In some embodiments, an object identification request may include any suitable data such as an identifier for the video content (e.g., an alphanumeric identifier that uniquely identifies the video content), a current run time, coordinates (e.g., x, y, coordinates indicating a location), bounding box locations and/or dimensions, or the like). The content processing engine may be configured to utilize the run time to identify the scene within the video content from the metadata associated with the video content (e.g., the metadata 300 of FIG. 3). If a scene is identified and the metadata indicates one or more objects as being associated with the scene, then one or more graphical elements (e.g., graphical elements 506-512) corresponding to those objects may be presented at the interface 500 as depicted in FIG. 5. In some embodiments, the graphical elements 506-512 may include an object image with an embedded hyperlink that, if selected, may navigate the user to a webpage from which the object may be procured (e.g., purchased). In some embodiments, the graphical elements 506-512 may be displayed in accordance with the confidence scores associated with the corresponding objects as identified from the metadata. That is, graphical elements corresponding to objects that are most confidently detected may appear in a more prominent position than graphical elements corresponding to objects that are less confidently detected. In some embodiments, the graphical elements may be presented for the duration of the scene or according to some predetermined time period (e.g., a default period of time such as ten seconds, 30 seconds, etc.).

In some embodiments, a user may be viewing video content and may utilize the control area 504 to pause the video content. The user bay utilize an input device (e.g., a mouse, a finger for touch input, etc.) to draw a bounding box 514 (or otherwise provide user input such as selecting an object, for example, by drawing bounding box 516 around an object (e.g., a dress)). Location data (e.g., dimensions of the bounding box, coordinates, etc.) for the bounding box (or selection) within the video frame may be identified. The location data may be transmitted in an object identification request to the content processing engine (e.g., the content processing engine 102 of FIG. 1). The content processing engine may be configured to confer with metadata 300 to identify a scene and/or video frame corresponding to the run time. In some embodiments, an object associated with the run time and a location within a threshold distance of the location data of the bounding box (or selection) may be determined. If an object is found, any suitable portion of its associated object attributes (e.g., an object image, a hyperlink, etc.) and/or one or more graphical elements corresponding to the objects (e.g., graphical elements 506-512 including hyperlinks to webpages from which the featured objects may be purchased) may be provided to the user device for display. In this manner, a user may explicitly select an object to be identified within the video content without having to leave the interface 500 as would be required conventionally. It should be appreciated that graphical elements 506-512 are intended to depict the object detected within bounding box 514 and that, potentially, a different set of objects may be provided were bounding box 516 to be utilized.

Figure 6:
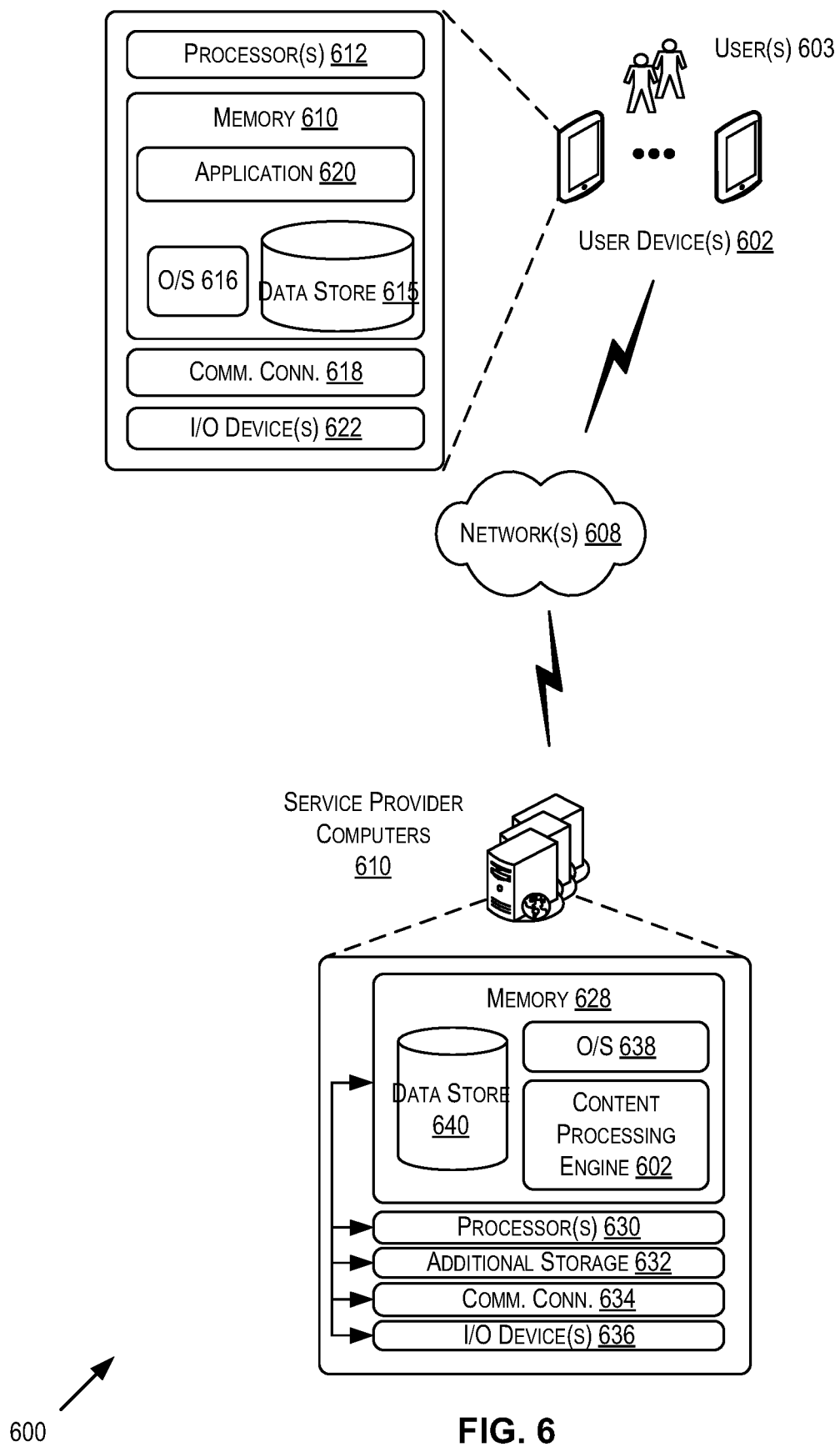
FIG. 6 illustrates an example system for detecting objects within video content utilizing the content processing engine, in accordance with at least one embodiment.

FIG. 6 illustrates an exemplary system 600 for detecting objects within video content utilizing the content processing engine 602 (e.g., the content processing engine 102 of FIG. 1), in accordance with at least one embodiment. In system 600, one or more user(s) 603 may utilize a user device (e.g., a user device of a collection of user device(s) 604 to provide input to the service provider computer(s) 610 (e.g., the service provider computer(s) 106 of FIG. 1). In some embodiments, a user may access any suitable input/output devices (e.g., I/O devices 622 discussed below) such as a keyboard, a mouse, a touchpad, an accelerometer, and the like, to provide input (e.g., via an application 620 running on the user device(s) 604) to request content from service provider computer(s) 610 via one or more network(s) 608. By way of example, a user may navigate to an electronic content catalog (e.g., video content hosted by the service provider computer(s) 610) where he may access any suitable video content. In some embodiments, access to such content may be in accordance with a subscription and/or fee. In some aspects, the application 620 (e.g., a web browser application, a content player application, an application associated with a streaming service, etc.) operating on the user device(s) 604 may be configured to display the content (e.g., video content) provided by service provider computer(s) 610. In some embodiments, the content processing engine 602 may host the application 620 such that video content provided by the content processing engine 602 may be played by the application 620. In some embodiments, the video content may be provided by a separate service and/or entity different from the service provider computer(s) 610. In these embodiments, the application 620 may be in communication with the video content provider as well as the content processing engine 602 of the service provider computer(s) 610.

In some examples, the network(s) 608 may include any one or a combination of many different types of networks, such as cable networks, the Internet, wireless networks, cellular networks, and other private and/or public networks. While the illustrated example represents the user(s) 603 accessing content over the network(s) 608, the described techniques may equally apply in instances where the user(s) 603 interact with the service provider computer(s) 610 via the one or more user device(s) 604 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, the content processing engine 602, discussed further below in more detail, may operate in whole or in part on the user device(s) 604. Thus, in some embodiments, the user(s) 603 may access the functionality of the content processing engine 602 directly through the user device(s) 604 and/or the service provider computer(s) 610 via user interfaces provided by the application 620.

In some embodiments, the application 620 be utilized to request content from the service provider computer(s) 410 so as to provide the various functionality described above with respect to the content processing engine 102. For example, the application 620 may be a content player configured to play video content provided by the service provider computer(s) 610 or another video content provider (not depicted). In some embodiments, the application 620

(e.g., a web browser application, a streaming application, etc.) may be configured to convey user input(s) (e.g., bounding box dimensions and location) and/or some portion of playback data (e.g., a content identifier, a run time, etc.) to the content processing engine 602. The application 620 may be configured to receive, process, and render any suitable data received from the content processing 602 such as graphical elements (e.g., object images with embedded hyperlinks) that, when selected, present a webpage associated with an object through which the object may be procured (e.g., from an online retailer).

The service provider computer(s) 610, perhaps arranged in a cluster of servers or as a server farm, may host the application 620 operating on the user device(s) 604 and/or cloud-based software services. Other server architectures may also be used to host the application 620 and/or cloud-based software services. The application 620 operating on the user device(s) 604 may be capable of handling requests from the user(s) 603 and serving, in response, various user interfaces and/or output that can be presented at the user device(s) 604. In some embodiments, the application 620 operating on the user device(s) 604 can present any suitable type of website that supports user interaction. The described techniques can similarly be implemented outside of the application 620, such as with other applications running on the user device(s) 604.

The user device(s) 604 may be any suitable type of computing device such as, but not limited to, a mobile phone, a touch screen device, a smartphone, a personal digital assistant (PDA), a laptop computer, a desktop computer, a tablet PC, an electronic book (e-book) reader, etc. In some examples, the user device(s) 604 may be in communication with the service provider computer(s) 610 via the network(s) 608, or via other network connections.

In one illustrative configuration, the user device(s) 604 may include at least one memory 612 and one or more processing units (or processor(s)) 614. The processor(s) 614 may be implemented as appropriate in hardware, computer-executable instructions, firmware, or combinations thereof. Computer-executable instruction or firmware implementations of the processor(s) 614 may include computer-executable or machine-executable instructions written in any suitable programming language to perform the various functions described.

The memory 612 may store program instructions that are loadable and executable on the processor(s) 614, as well as data generated during the execution of these programs. Depending on the configuration and type of user computing device, the memory 612 may be volatile (such as random access memory (RAM)) and/or non-volatile (such as read-only memory (ROM), flash memory, etc.). The user device(s) 604 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 612 may include multiple different types of memory, such as static random access memory (SRAM), dynamic random access memory (DRAM), or ROM.

Turning to the contents of the memory 612 in more detail, the memory 612 may include an operating system 616, one or more data stores 615, and one or more application programs, modules, or services for implementing the features of the content processing engine 602 disclosed herein, provided via the application 620. The application 620 may be configured to receive, store, and/or display a webpage or other interface for interacting with the service provider computer(s) 610. In some embodiments, the memory 612 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 604 may also contain communications connection(s) 618 that allow the user device(s) 604 to communicate with a stored database, another computing device (e.g., another of the user device(s) 604) or server (e.g., the service provider computer(s) 610), user terminals and/or other devices on the network(s) 608. The user device(s) 604 may also include I/O device(s) 622, such as a keyboard, a mouse, a touch input device, a display, speakers, a printer, an accelerometer, a gyroscope, etc.

In some aspects, the service provider computer(s) 610 may also be any suitable type of computing devices such as, but not limited to, a mobile phone, a smart speaker, smart phone, a personal digital assistant (PDA), a laptop computer, a desktop computer, a server computer, a thin-client device, a tablet PC, etc. Additionally, it should be noted that in some embodiments, the service provider computer(s) 610 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 610 may be in communication with the user device(s) 604 and/or other service providers via the network(s) 608 or via other network connections. The service provider computer(s) 610 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 610 may include at least one memory 628 and one or more processing units (or processor(s)) 630. The processor(s) 430 may be implemented as appropriate in hardware, computer-executable instructions, firmware, or combinations thereof. Computer-executable instruction or firmware implementations of the processor(s) 630 may include computer-executable or machine-executable instructions written in any suitable programming language to perform the various functions described.

The memory 628 may store program instructions that are loadable and executable on the processor(s) 630, as well as data generated during the execution of these programs. Depending on the configuration and type of service provider computer(s) 610, the memory 628 may be volatile (such as RAM) and/or non-volatile (such as ROM, flash memory, etc.). The service provider computer(s) 610 or servers may also include additional storage 632, which may include removable storage and/or non-removable storage. The additional storage 632 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 628 may include multiple different types of memory, such as SRAM, DRAM, or ROM.

The memory 628, the additional storage 632, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 628 and the additional storage 632 are all examples of computer storage media. Additional types of computer storage media that may be present in the service provider computer(s) 610 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 610. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 610 may also contain communications connection(s) 634 that allow the service provider computer(s) 610 to communicate with a stored database, another computing device or server, user terminals and/or other devices on the network(s) 608. The service provider computer(s) 610 may also include I/O device(s) 636, such as a keyboard, a mouse, a pen, a voice input device, a touch input device, a display, speakers, a printer, etc.

Turning to the contents of the memory 628 in more detail, the memory 628 may include an operating system 638, one or more data stores 640, and/or one or more application programs, modules, or services for implementing the features disclosed herein, such as the features provided by the content processing engine 602.

Figure 7:
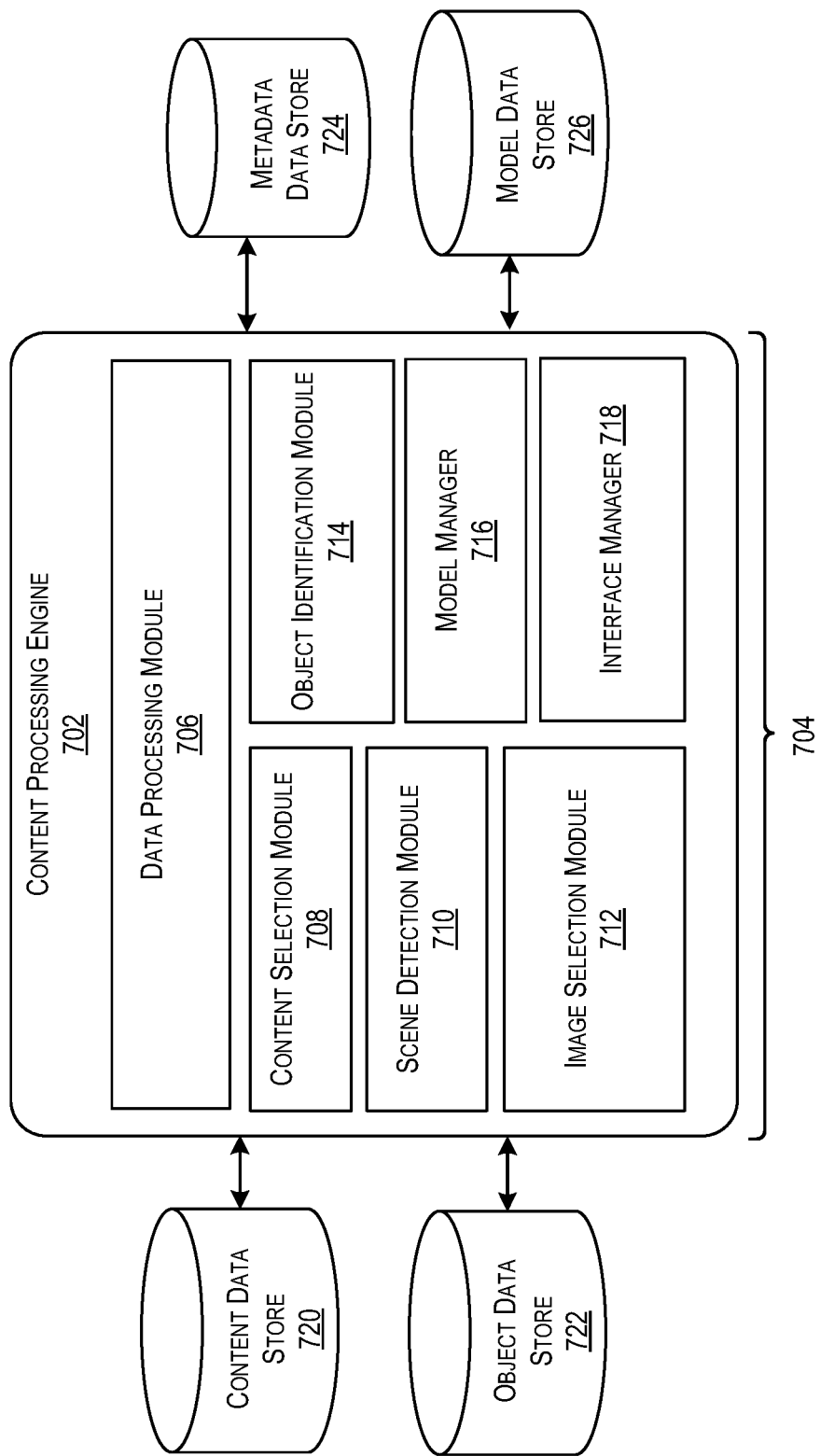
FIG. 7 is a schematic diagram of an example computer architecture for the content processing engine, including a plurality of modules that may perform functions in accordance with at least one embodiment.

FIG. 7 is a schematic diagram of an example computer architecture 700 for the content processing engine 702 (e.g., content processing engine 102 of FIG. 1), including a plurality of modules 704 that may perform functions in accordance with at least one embodiment. The modules 704 may be software modules, hardware modules, or a combination thereof. If the modules 504 are software modules, the modules 704 can be embodied on a computer readable medium and processed by a processor in any of the computer systems described herein. The modules 704, or some portion of the modules 704, may be operate as separate modules or the functionality provided by the module 704 may be provided in any suitable manner by a greater or fewer number of modules then the number depicted in FIG. 7.

In the embodiment shown in the FIG. 7, a content data store 720, object data store 722, metadata data store 724, and model data store 726 are shown, although data (e.g., content metadata) can be maintained, derived, or otherwise accessed from various data stores, either remote or local to the content processing engine 702, to achieve the functions described herein. In at least one embodiment, the data stores 720-726 may be physically located on the user device 104 of FIG. 1, on the service provider computer(s) 610 of FIG. 6, or a location accessible to the user device 104 or service provider computer(s) 610. The content processing engine 702, as shown in FIG. 7, includes various modules 704 such as a data processing module 706, content selection module 708, scene detection module 710, image selection module 712, object identification module 714, model manager 716, and interface manager 718. Some functions of the modules 704 are described below. However, for the benefit of the reader, a brief, non-limiting description of each of the modules is provided in the following paragraphs. In accordance with at least one embodiment, a process is identifying potential feature combinations for a new item.

In at least one embodiment, the content processing engine 702 includes the data processing module 706. Generally, the data processing module 706 may be utilized to receive and/or transmit any suitable information with respect to any example provided herein. The data processing module 706 may include any suitable number of application programming interfaces (APIs) with which the functionality of the content processing engine 702 may be invoked. In some embodiments, the data processing module 706 may be configured to receive a collection of video content which may be stored by the data processing module 706 in the content data store 720. Object data such as a catalog of objects each being associated with a set of object attributes (e.g., an object identifier, a title, a description, a color, a material, size, dimensions, an object image, URL, or any suitable attribute of the object) may be received by the data processing module 706 and stored in the object data store 722. The data processing module 706 may receive previously trained machine-learning models (e.g., one or more neural networks) for object detection/feature extraction and store such models in the model data store 726 for subsequent use. The data processing module 706 may be configured to receive user input and/or an object identification request and may execute any suitable function call to invoke the functionality of any other module of the modules 704. In some embodiments, the data processing module 706 may provide any or all data from the object identification request (e.g., a run time, location data, object selection coordinates, bounding box dimensions and/or coordinates, content identifier, etc.) to any of the other components of content processing engine 702.

In some embodiments, the content processing engine 702 may include content selection module 708. Content selection module 708 may be configured to select particular video content as described above in connection block 204 of FIG. 2. As a non-limiting example, the content selection module 708 may execute a manual selection process or the rule-based selection process described above in connection with blocks 206 and 208 of FIG. 2, respectively. In a manual selection process, the content selection module 708 may receive user input indicating particular video content to be processed. In a rule-based selection process, the content selection module 708 may access rule set (e.g., a rule set stored in content data store) that provides a set of predefined rules for video selection.

In some embodiments, the content processing engine 702 may include scene detection module 710. Scene detection module 710 may be configured to perform any suitable operations corresponding to the scene detection process 210 described above in connection with FIG. 2. For example, the scene detection module 710 may compare temporally adjacent video frames to identify when two frames differ from one another by over some threshold amount. When this threshold is exceeded, the scene detection module 710 may generate metadata for each scene, assign each scene a scene identifier, determine a start time and end time for each scene, and store this metadata in metadata data store 724. In some embodiments, when two temporally adjacent frames differ over a threshold amount, the run time of the first frame may be identified as the end time of the previous scene, and the run time of the second frame may be identified as the start time of the next scene. A first frame of the video content may be identified as the start time of the first scene.

In some embodiments, the content processing engine 702 may include image selection module 712. Image selection module 712 may execute any suitable operations for calculating a quality score and selecting images based at least in part on those quality scores. For example, image selection module 712 may perform any operations discussed above in reference to the image selection process 212 of FIG. 2 and the process 400 of FIG. 4. For example, the image selection module 712 may access a model (e.g., from the model data store 728) that has been previously trained to identify object features (e.g., object attributes that describe an object such as color, material, size, and the like, portions of an object such as a sleeve, a collar, a button, a hood, a chair leg, and the like, or any suitable descriptor of an object) from input data. In some embodiments, the model may be a neural network that may take as input a video frame and output corresponding object features. In some embodiments, location data specifying a location of each object feature (or the object as a whole) may be additionally provided as model output. The image selection module 712 may be configured to utilize a set of predefined rules for calculating a quality score for each set of video frames of a scene and for each scene in the video content. A predetermined number of frames may be selected from each scene, or a number of frames that exceed a quality threshold may be selected from each scene, based at least in part on the quality scores assigned to each frame. The quality score may be calculated based at least in part on a number of object features determined to be visible, the specific object features visible, the type of object, and a set of predefined rules that indicate a predefined feature set corresponding to a "best depiction" of the type of object.

In some embodiments, the content processing engine 702 may include object identification module 714. The object identification module 714 may be configured to execute any suitable operations described above with respect to the object detection process 214 of FIG. 2. For example, the object identification module 714 may receive a set of object features from the image selection module 712 or the object identification module 714 may obtain the model from the model data store 728 to identify one or more sets of object features from the images selected by the image selection module 712. The object identification module 714 may access the object data store 722 to access predefined object feature sets of one or more predefined objects to compare the object feature sets determined from the video frame to the predefined object feature sets to determine match(es). If the detected feature set matches by at least some threshold number of features with a predefined object feature set, then the object detected in the video frame may be identified as being the predefined object. In some embodiments, the object identification module 714 may utilize another a machine-learning model that has been previously trained to identify an object based at least in part on an set of object features provided as input. This model may be previously trained using labeled data (e.g., object feature sets each labeled with the object to which the object feature set corresponds) and a supervised learning algorithm.

In some embodiments, the object identification module 714 may be configured to generate, modify, and/or store metadata in the metadata data store 724. The metadata may be associated with the scene. The object identification module 714 may include any suitable number of objects and/or attributes of the objects in the metadata for the scene. In some embodiments, the object identification module 714 may add any suitable output from the model (e.g., a confidence score) to the metadata. The object identification module 714 may further identify a number of instances the object appears in the selected video frames and may include this number in the metadata associated with the object and scene.

In some embodiments, the content processing engine 702 may include model manager 716. The model manager 716 may be configured to manage one or more models. In some embodiments, the model manager 716 may obtain training data sets (e.g., labeled data) with which to train one or more models utilizing supervised learning algorithms. For example, a model may be trained using a set of example video frames each manually labeled with the objects depicted within the video frame. This model may be trained to identify object within subsequent video frames provided as input. As more objects are detected in new video frame instances, the input and output of the model may be added to the training data set and the model manager 716 may update and/or retrain the model using the updated training data set. As another example, the model manager 716 may similarly train a model to identify object features and objects from a video frame. As yet another example, the model manager 716 may object training data that include sets of object features, each labeled with the specific object to which the features correspond. Like the other models, the model manager 716 may train this model to identify objects from object feature sets provided as input using the training data and a supervised learning algorithm. Other models are contemplated. Generally, the model manager 716 may be configured to manage, train, retrain, and/or update any of the machine-learning models discussed herein.

In some embodiments, the content processing engine 702 may include interface manager 718. The interface manager 718 may be configured to provide any suitable number of object attributes (e.g., an image, a description, a title, a URL, an object identifier, or any suitable data that describes and/or is associated with a particular object) to a user device to cause the user device to render the information at the user device. In some embodiments, the interface manager 718 may be configured to serve data and receive user input from the interface 500 of FIG. 5. Thus, any data presented at the interface 500 may be provided by the interface manager 718 and any user input provided at the interface 500 may be received and processed by the interface manager 718.

Figure 8:
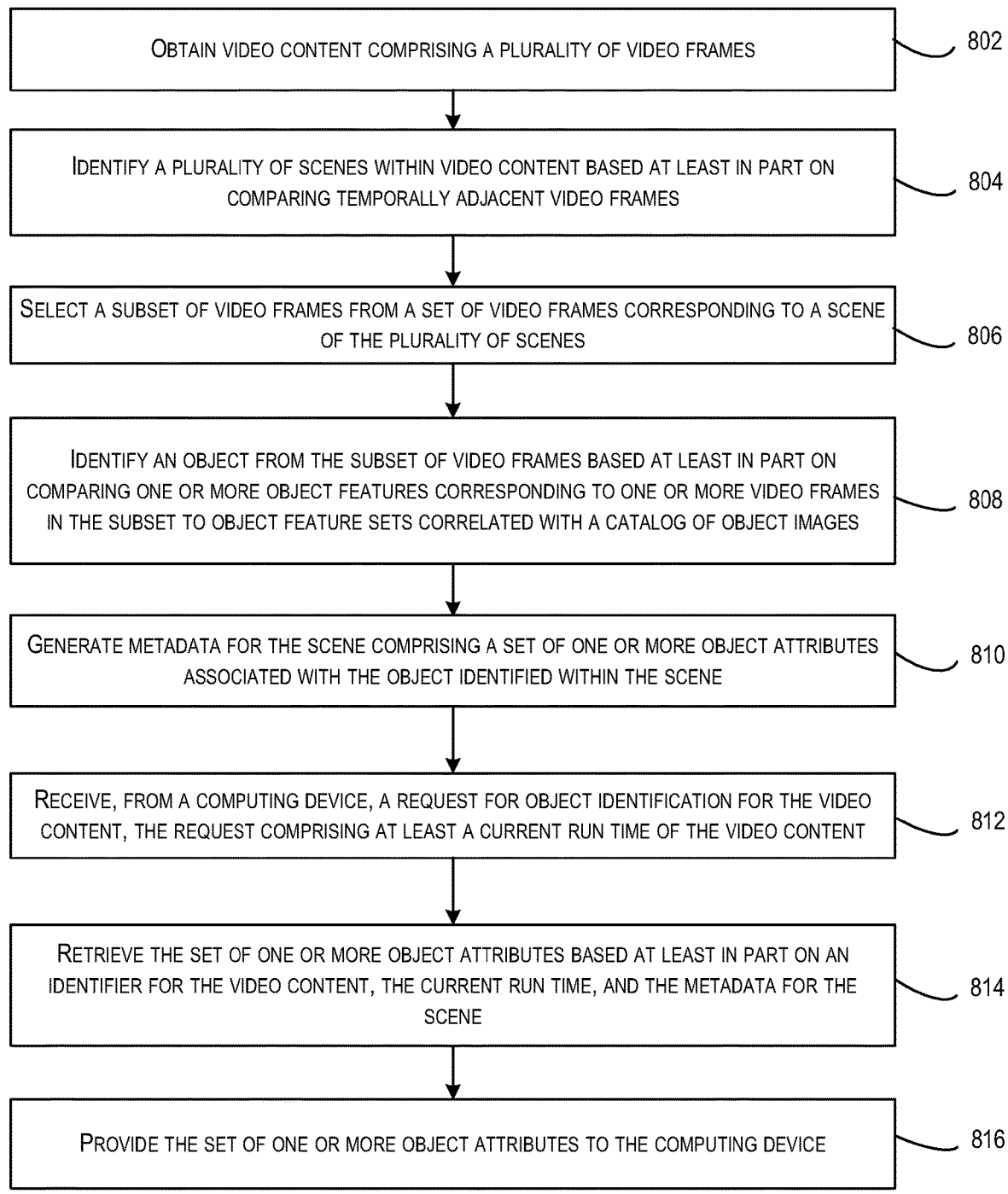
FIG. 8 is a flowchart illustrating an example method for identifying one or more objects from video content, in accordance with at least one embodiment.

FIG. 8 is a flowchart illustrating an example method for identifying one or more objects from video content, in accordance with at least one embodiment. It should be appreciated that the operations of the method 800 may be performed in any suitable, not necessarily the order depicted in FIG. 8. Further, the method 800 may include additional, or fewer operations than those depicted in FIG. 8. The operations of method 800 may be performed by any suitable combination of the modules 704 of the content processing engine 702 of FIG. 7 which may operate in whole or in part on a user device (e.g., one or more of the user device(s) 604 of FIG. 6) and/or the service provider computer(s) 610 of FIG. 6.

The method 800 may begin at 802, where video content comprising a plurality of video frames may be obtained. By way of example, video content may be obtained by the content selection module 708 from the content data store 720 of FIG. 7. In some examples, the content selection module 708 may select a single instance of video content or the content selection module 708 may select more than one instance of video content. The selection of video content may be in response to received user input (e.g., the manual selection process 206 of FIG. 2) or the video content may be selected according to a predetermined rules set (e.g., by executing the rule-based selection process 208 of FIG. 2).

At 804, a plurality of scenes within video content may be identified (e.g., by the scene detection module 710 of FIG. 7) based at least in part on comparing temporally adjacent video frames. For example, the scene detection module 710 may execute the scene detection process 210 discussed above in connection to FIG. 2.

At 806, a subset of video frames may be selected from a set of video frames corresponding to a scene of the plurality of scenes. In some embodiments, the subset of video frames may be selected by the image selection module 712 of FIG. 7 through execution of the image selection process 212 of FIG. 2.

At 808, an object may be identified (e.g., by the object identification module 714 of FIG. 7) from the subset of video frames based at least in part on comparing one or more object features corresponding to one or more video frames in the subset to object feature sets correlated with a catalog of object images. In other words, the object identification module 714 may execute the object detection process 214 of FIG. 2. In some embodiments, this process may include executing the object feature extraction process 216 of FIG. 2.

At 810, metadata for the scene may be identified (e.g., by the object identification module 714) comprising a set of one or more object attributes (e.g., an object identifier, an image of the object, a category of the object, or the like) associated with the object identified within the scene. The metadata may include any suitable output (e.g., a confidence score) of a model utilized for the object detection process performed at 808. In some embodiments, the metadata may include a count of the number of instances an object appears in the subset of video frames.

At 812, a request for object identification may be received (e.g., by the interface manager 718) from a computing device (e.g., from a user device). In some embodiments, the video content may be playing at the user device. The request may comprise at least an identifier for the video content (e.g., an alphanumeric identifier that uniquely identifies the video content) and a current run time of the video content being played at the user device.

At 814, the set of one or more object attributes may be retrieved (e.g., by the object identification module 714) based at least in part on the identifier for the video content, the current run time and the metadata for the scene. By way of example, the current run time may be compared to start and end times associated with various scenes of the content to identify a particular scene (e.g., a scene for which the start time is at or less than the current run time and a corresponding end time that is at or greater than the current run time). Once the particular scene is identified, the set of one or more object attributes may be retrieved from the metadata associated with the scene.

At 816, the set of one or more object attributes may be provided (e.g., by the interface manager 718) to the computing device.

Figure 9:
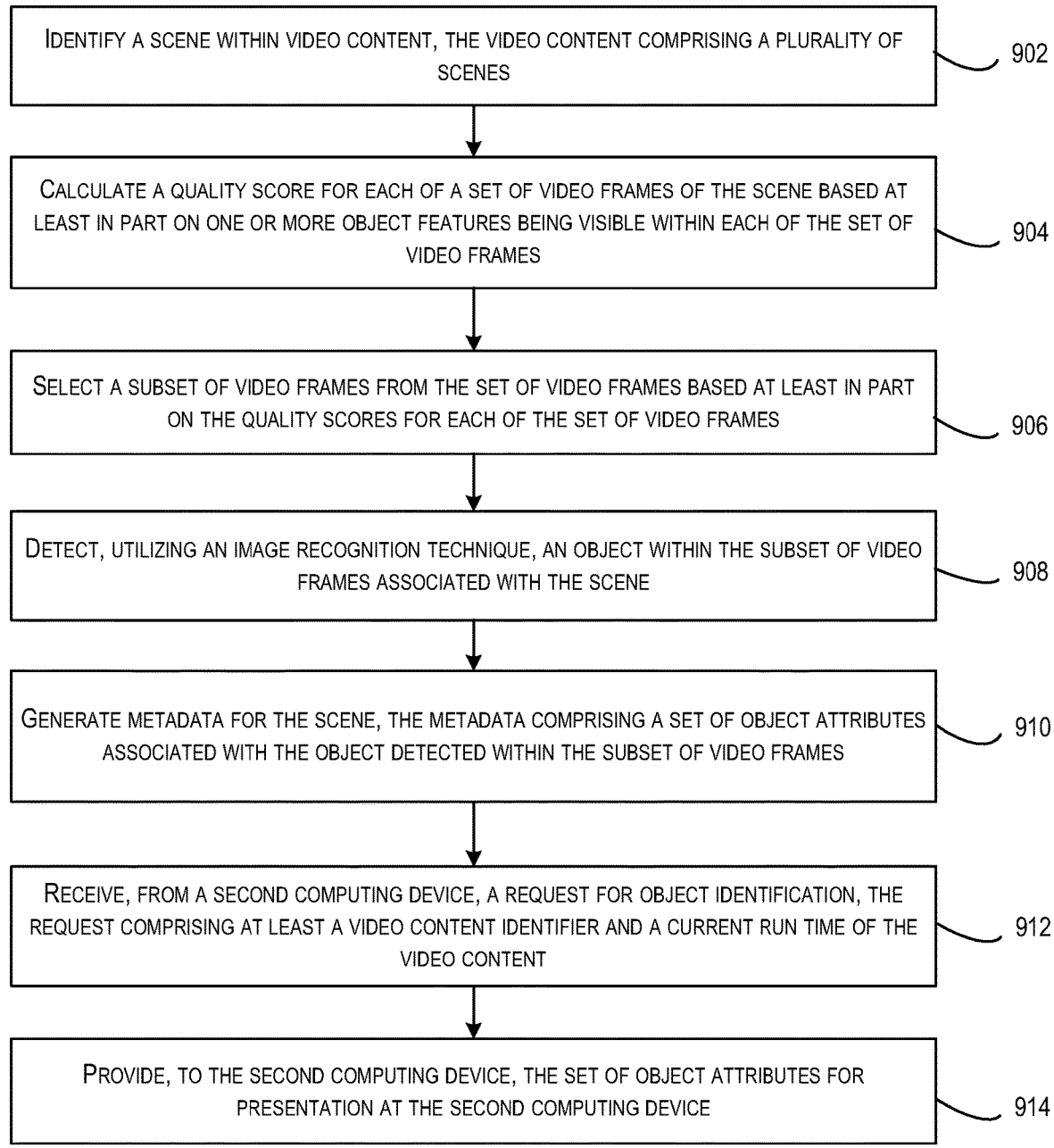
FIG. 9 is another flowchart illustrating another example method for identifying one or more objects from video content, in accordance with at least one embodiment.

FIG. 9 is another flowchart illustrating another example method 900 for identifying one or more objects from video content, in accordance with at least one embodiment. It should be appreciated that the operations of the method 900 may be performed in any suitable, not necessarily the order depicted in FIG. 9. Further, the method 900 may include additional, or fewer operations than those depicted in FIG. 9. The operations of method 900 may be performed by any suitable combination of the modules 704 of the content processing engine 702 of FIG. 7 which may operate in whole or in part on a computing device (e.g., one or more of the user device(s) 604 of FIG. 6) and/or the service provider computer(s) 610 of FIG. 6. The computing device and/or the service provider computer(s) 610 may comprise one or more processors and one or more computer-readable memories storing executable instructions that, when executed with the one or more processors, cause the computing device to perform at least the steps of method 900.

Method 900 may begin at 902, where a scene may be identified (e.g., by the scene detection module 710 of FIG. 7) within video content. In some embodiments, the video content may comprise a plurality of scenes. As a non-limiting example, the scene detection module 710 may execute the scene detection process discussed at 210 in connection with FIG. 2.

At 904, a quality score may be calculated (e.g., by the image selection module 712 of FIG. 7) for each of a set of video frames of the scene. In some embodiments, the quality score may be calculated based at least in part on one or more object features being visible within each of the set of video frames. For example, a first object having a greater number of object features visible than a second object may receive a higher quality score than the second object.

At 906, a subset of video frames may be selected (e.g., by the image selection module 712) from the set of video frames based at least in part on the quality scores for each of the set of video frames. By way of example, the image selection module 712 may select a number (e.g., 3, 5, etc.) of video frames corresponding to the highest quality scores. As another example, the image selection module 712 may select video frames that exceed a predetermined quality threshold value.

At 908, an object may be detected (e.g., by the object identification module 714), utilizing an image recognition technique, within the subset of video frames associated with the scene. By way of example, the object identification module 714 may utilize a model that has been previously trained (e.g., by the model manager 716) to identify objects and/or features of provided video frames.

At 910, metadata may be generated (e.g., by the object identification module 714) for the scene. In some embodiments, the metadata may comprise a set of object attributes associated with the object detected within the subset of video frames. In some embodiments, the model utilized at 908 may output a set of object features detected with a video frame. The object identification module 714 may compare the output to object features of a catalog of objects to identify objects that match (to a threshold degree). Objects with features match over a threshold amount to the features detected in the video frame may be utilized to generate metadata that includes these features.

At 912, a request for object identification may be received (e.g., by the object identification module 714) from a second computing device. In some embodiments, the request may comprise at least a video content identifier (e.g., an alphanumeric identifier that uniquely identifies the video content) and a current run time of the video content.

At 914, the set of object attributes may be provided (e.g., by the interface manager 718) for presentation at the second computing device. In some embodiments, the set of object attributes may be provided in response to the request received at 912.

Figure 10:
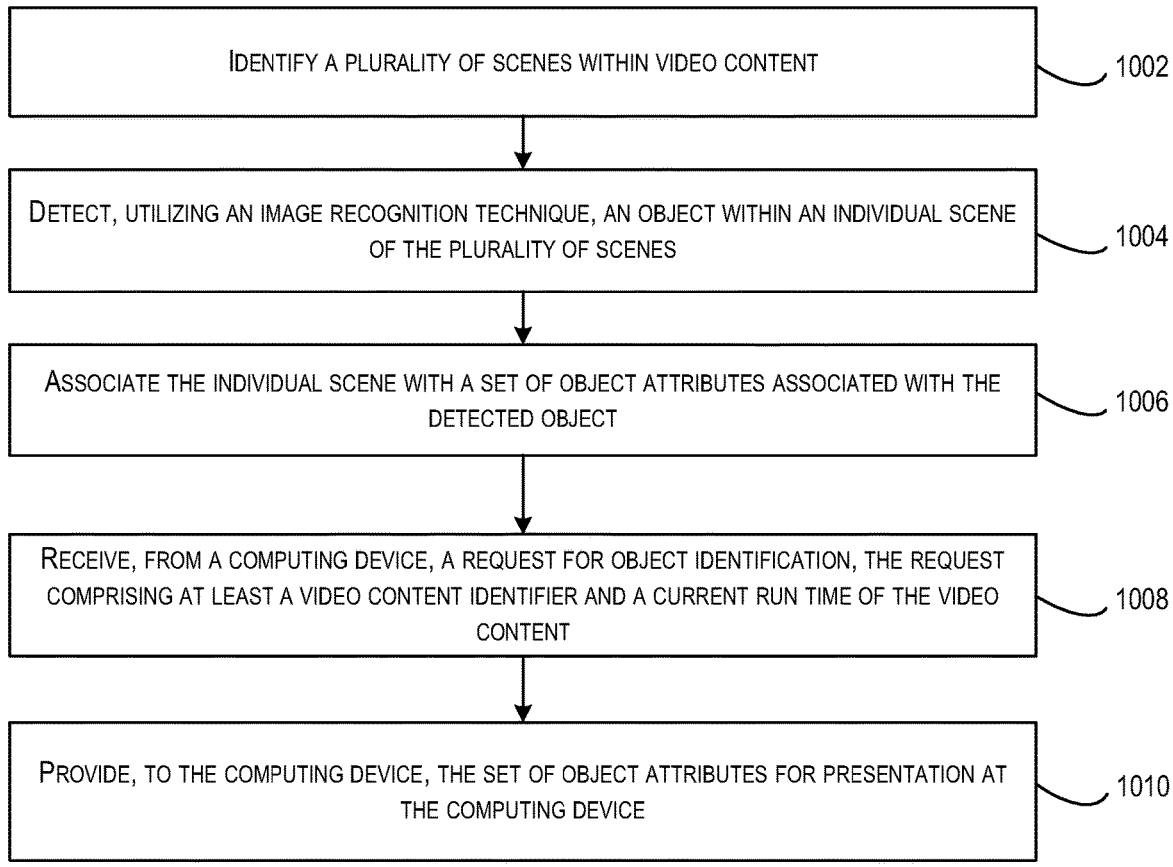
FIG. 10 is yet another flowchart illustrating yet another example method for identifying one or more objects from video content, in accordance with at least one embodiment.

FIG. 10 is yet another flowchart illustrating yet another example method 1000 for identifying one or more objects from video content, in accordance with at least one embodiment. It should be appreciated that the operations of the method 1000 may be performed in any suitable, not necessarily the order depicted in FIG. 10. Further, the method 1000 may include additional, or fewer operations than those depicted in FIG. 10. The operations of method 1000 may be performed by any suitable combination of the modules 704 of the content processing engine 702 of FIG. 7 which may operate in whole or in part on a computing device (e.g., one or more of the user device(s) 604 of FIG. 6) and/or the service provider computer(s) 610 of FIG. 6. A computer-readable storage medium may comprise executable instructions that, upon execution with one or more processors of a computing system, cause the computing system to perform the operations of method 1000.

The method 1000 may begin at 1002, where a plurality of scenes may be identified (e.g., by the scene detection module 710 of FIG. 7) within video content. In some embodiments, the scene detection module 710 may execute the scene detection process 210 of FIG. 2.

At 1004, an object may be detected (e.g., by the object identification module 714 of FIG. 7) utilizing an image recognition technique. In some embodiments, the object may be detected within an individual scene of the plurality of scenes. The object identification module 714 may execute the object detection process 214 of FIG. 4, in some embodiments, execution of the object detection process 214 may include executing the object feature extraction process 216.

At 1006, the individual scene may be associated (e.g., by the object identification module 714) with a set of object attributes associated with the detected object. In some embodiments, the object identification module 714 may utilize a model previously trained to identify a set of object features. These object features may be compared to object features of a catalog of objects. Objects that are associated with over some threshold of matching features may be considered a match and some portion of the object attributes associated with the matching object may be added to the metadata of the scene.

At 1008, a request for object identification may be received (e.g., by the interface manager 718 of FIG. 7) from a computing device. In some embodiments, the request may comprise at least a video content identifier (e.g., an alphanumeric identifier that uniquely identifies the video content) and a current run time of the video content.

At 1010, the set of object attributes may be provided to the user device (e.g., by the interface manager 718) for presentation at the computing device.

The various embodiments discussed above can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

Embodiments can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining video content comprising a plurality of video frames;
    identifying a plurality of scenes within the video content based at least in part on comparing temporally adjacent video frames;
    selecting a subset of video frames from a set of video frames corresponding to a scene of the plurality of scenes;
    identifying an object from the subset of video frames based at least in part on comparing one or more object features corresponding to one or more video frames in the subset of video frames to object feature sets correlated with a catalog of object images;
    generating metadata for the scene comprising a set of one or more object attributes associated with the object identified within the scene;
    receiving, from a computing device, a request for object identification for the video content, the request comprising at least a current run time of the video content;
    retrieving the set of one or more object attributes based at least in part on an identifier for the video content, the current run time, and the metadata for the scene; and
    providing the set of one or more object attributes to the computing device.

2. The computer-implemented method of claim 1, wherein identifying the one or more object features within each video frame of the set of video frames comprises providing video data corresponding to each video frame as input to a machine-learning model.

3. The computer-implemented method of claim 2, further comprising:
    identifying one or more object features within each video frame of the set of video frames; and calculating a quality score for each video frame of the set of video frames based at least in part on the one or more object features identified, wherein the subset of video frames is selected based at least in part on the quality score for each video frame.

4. The computer-implemented method of claim 3, wherein calculating the quality score for a given video frame is based at least in part on determining an amount of the object that is visible within the given video frame.

5. The computer-implemented method of claim 1, wherein the subset of video frames are selected from the set of video frames based at least in part on identifying that quality scores of the subset of video frames each exceed a quality threshold.

6. The computer-implemented method of claim 1, wherein the catalog of object images is associated with an online catalog of items.

7. The computer-implemented method of claim 1, wherein providing the set of one or more object attributes to the computing device to cause the computing device to present a navigational link to an item detail page corresponding to the object.

8. A computing device, comprising:
one or more processors; and
one or more computer-readable memories storing executable instructions that, when executed with the one or more processors, cause the computing device to, at least:
identify a scene within video content, the video content comprising a plurality of scenes;
calculate a quality score for each of a set of video frames of the scene based at least in part on one or more object features being visible within each of the set of video frames;
select a subset of video frames from the set of video frames based at least in part on the quality scores for each of the set of video frames;
detect, utilizing an image recognition technique, an object within the subset of video frames associated with the scene;
generate metadata for the scene, the metadata comprising a set of object attributes associated with the object detected within the subset of video frames;
receive, from a second computing device, a request for object identification, the request comprising at least a video content identifier and a current run time of the video content; and
provide, to the second computing device, the set of object attributes for presentation at the second computing device.

9. The computing device of claim 8, wherein the set of object attributes comprises a uniform resource locator associated with an item detail page from which the object may be purchased.

10. The computing device of claim 8, wherein executing the instructions further causes the computing device to:
identify a set of objects found within each of a plurality of instances of video content, the plurality of instances of video content comprising the video content; and
perform operations to cause object attributes corresponding to the set of objects to be presented at the computing device.

11. The computing device of claim 8, wherein the metadata further comprises location data that indicates a time and a location within dimensions of a video frame at which the object is depicted and wherein the request further comprises coordinates corresponding to user input.

12. The computing device of claim 11, wherein executing the instructions further causes the computing device to identify the object based at least in part on the location data, a content identifier, the current run time of the request, and bounding box dimensions of the request.

13. The computing device of claim 8, wherein executing the instructions further causes the computing device to detect the object within a number of video frames of the scene, wherein the metadata for the scene is generated further based at least in part on identifying that the number of video frames in which the object was detected exceeds a threshold number.

14. A non-transitory computer-readable storage medium comprising executable instructions that, upon execution with one or more processors of a computing system, cause the computing system to perform operations comprising:
identifying a plurality of scenes within video content;
detecting, utilizing an image recognition technique, an object within an individual scene of the plurality of scenes;
associating the individual scene with a set of object attributes associated with the object;
receiving, from a computing device, a request for object identification, the request comprising at least a video content identifier and a current run time of the video content; and
providing, to the computing device, the set of object attributes for presentation at the computing device.

15. The non-transitory computer-readable storage medium of claim 14, wherein identifying the plurality of scenes comprises:
comparing temporally adjacent video frames of the individual scene to calculate a similarity score quantifying a degree of similarity between the temporally adjacent video frames; and
when the similarity score meets a threshold condition, determining that a first video frame of the temporally adjacent video frames is a last video frame of a first scene and a second video frame of the temporally adjacent video frames is the first video frame of a second scene.

16. The non-transitory computer-readable storage medium of claim 15, wherein executing the instructions further causes the computing system to perform additional operations comprising:
obtaining a set of video frames for the individual scene;
calculating a quality score for each of the set of video frames based at least in part on one or more object features being visible within each of the set of video frames; and
selecting a subset of video frames from the set of video frames based at least in part on the quality scores for each of the set of video frames.

17. The non-transitory computer-readable storage medium of claim 14, wherein detecting the object further comprises:
comparing the one or more object features to set of object features associated with objects of a catalog of objects; and
detecting the object in a video frame based at least in part on the comparison.

18. The non-transitory computer-readable storage medium of claim 17, wherein executing the instructions further causes the computing system to perform additional operations comprising modifying attributes of the object of the catalog of objects based at least in part on detecting the object in the video frame.

19. The non-transitory computer-readable storage medium of claim 14, wherein executing the instructions further causes the computing system to perform additional operations comprising calculating a relevancy score for the object based at least in part on the object being detected within a plurality of instances of video content, wherein providing the set of object attributes to the computing device is based at least in part on the relevancy score.

20. The non-transitory computer-readable storage medium of claim 14, wherein executing the instructions further causes the computing system to perform additional operations comprising:
   obtaining a set of training images, each of the set of training images being associated with a corresponding set of object attributes; and
   training a machine-learning model to identify object attributes within a video frame based at least in part on the set of training images and a supervised learning algorithm, wherein identifying the object is based at least in part on utilizing the machine-learning model.

\* \* \* \* \*